(12) United States Patent
Reagen et al.

(10) Patent No.: US 6,370,775 B1
(45) Date of Patent: Apr. 16, 2002

(54) METHOD OF MAKING A REFRIGERATION EVAPORATOR

(75) Inventors: Scot Reagen, Farmington Hills; Jeff Sensmeier, Orion Township, both of MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 0 days.

(21) Appl. No.: 09/512,595

(22) Filed: May 3, 2000

Related U.S. Application Data

(62) Division of application No. 09/265,672, filed on Mar. 10, 1999, now Pat. No. 6,253,839.

(51) Int. Cl.$^7$ .............................................. B23P 15/26
(52) U.S. Cl. ........................... 29/890.07; 29/890.043; 29/890.047
(58) Field of Search ................... 29/890.047, 890.07, 29/890.043, 727; 165/150, 151

(56) References Cited

U.S. PATENT DOCUMENTS

| | | | |
|---|---|---|---|
| 2,613,065 A | 10/1952 | Didier | |
| 3,217,798 A | * 11/1965 | Renzi | 29/890.043 |
| 3,515,207 A | 6/1970 | Lu | |
| 4,369,350 A | 1/1983 | Kobayashi et al. | |
| 4,449,581 A | 5/1984 | Blystone et al. | |
| 4,492,851 A | 1/1985 | Carr | |
| 4,580,623 A | * 4/1986 | Smitte et al. | 165/150 |
| 4,778,004 A | 10/1988 | Paulman et al. | |
| 4,881,311 A | * 11/1989 | Paulman et al. | 29/890.043 |
| 4,970,770 A | * 11/1990 | Jansson et al. | 29/890.044 |
| 5,099,574 A | 3/1992 | Paulman et al. | |
| 5,183,105 A | * 2/1993 | Adams | 165/150 |
| 5,203,403 A | 4/1993 | Yokoyama et al. | |
| 5,228,198 A | 7/1993 | Paulman et al. | |
| 5,267,610 A | * 12/1993 | Culbert | 165/151 |
| 5,533,251 A | * 7/1996 | Vetter | 29/890.043 |
| 5,535,820 A | * 7/1996 | Beagle et al. | 165/150 |
| 5,540,276 A | 7/1996 | Adams et al. | |
| 5,582,244 A | 12/1996 | Helms et al. | |
| 5,660,230 A | 8/1997 | Obosu et al. | |
| 5,704,123 A | 1/1998 | Paulman et al. | |
| 5,706,866 A | * 1/1998 | Kim | 29/890.047 |
| 5,765,284 A | * 6/1998 | Ali et al. | 29/890.047 |
| 5,799,725 A | 9/1998 | Bradley, Jr et al. | |
| 5,881,567 A | 3/1999 | Junge et al. | |
| 6,167,619 B1 | * 1/2001 | Beagle | 29/890.043 |

FOREIGN PATENT DOCUMENTS

| | | | |
|---|---|---|---|
| JP | 0217095 | 3/1992 | 165/150 |
| JP | 404086491 A | 3/1992 | 165/150 |

* cited by examiner

Primary Examiner—I Cuda Rosenbaum
(74) Attorney, Agent, or Firm—Jenner & Block

(57) ABSTRACT

A method of making an evaporator and the resultant evaporator. The resultant evaporator comprises a continuous serpentine tube having an inlet and an outlet. The serpentine tube includes at least one column of parallel tube runs. Each tube run is defined by at least one reverse bend. The column of parallel tube runs has an overall length defined by the distance between the outermost tube runs. The evaporator further comprises a plurality of inner fins attached to the individual tubes. Each inner fin extends between two tube runs defined by opposite ends of a reverse bend. The inner fins have a length less than the overall length the column of tube runs.

18 Claims, 8 Drawing Sheets

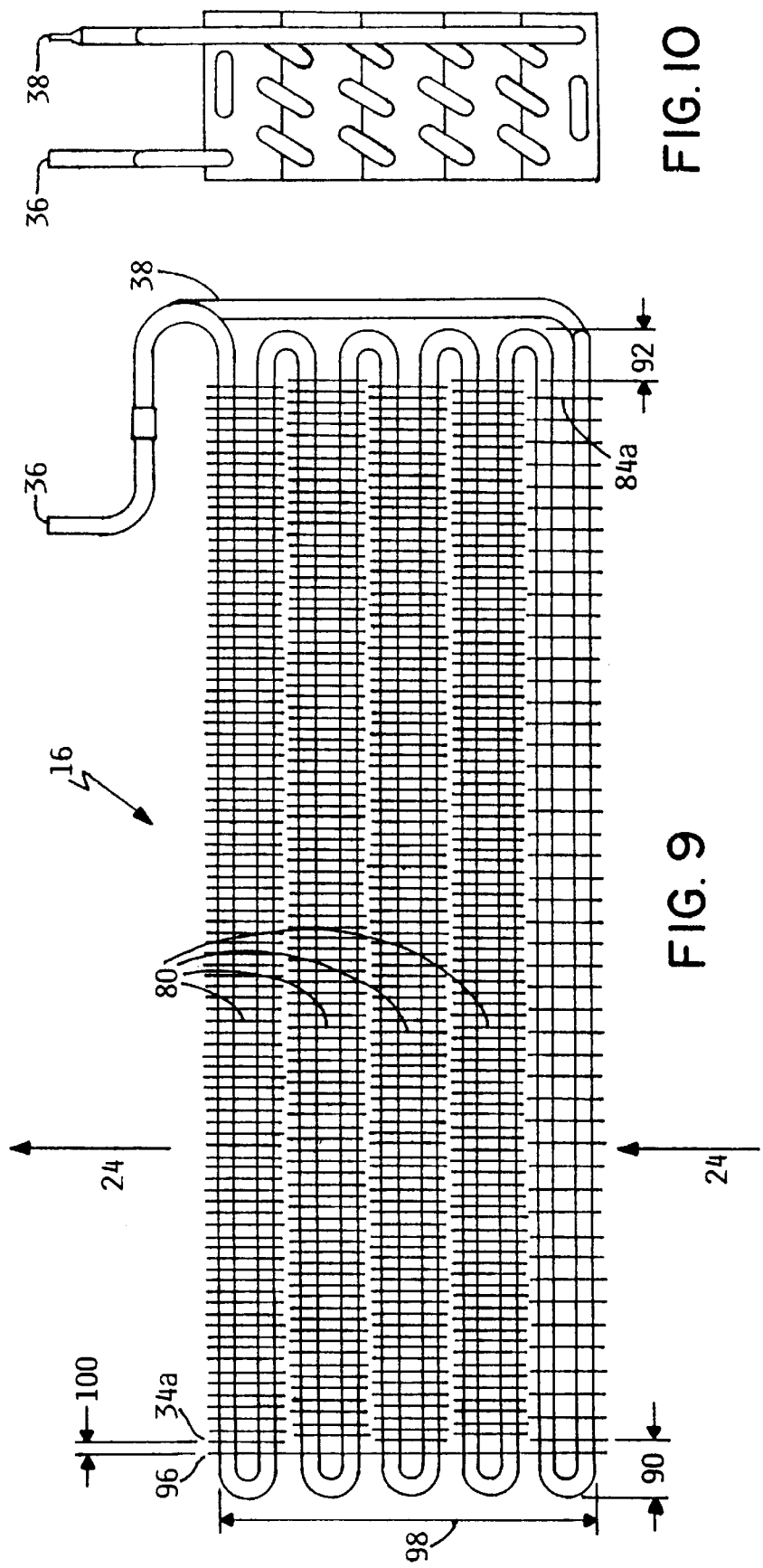

METHOD OF MAKING A REFRIGERATION EVAPORATOR

This is a divisional of application Ser. No. 09/265,672, field on Mar. 10, 1999, now U.S. Pat. No. 6,253,839.

FIELD OF THE INVENTION

The present invention relates generally to a method of making a heat exchanger and to the resultant heat exchanger. More particularly, it relates to a finned type heat exchanger and evaporator produced by inserting a serpentine tube bundle into a plurality of inner fins retained in a fixture at a staggered arrangement in which an interference fit between the inner fins and the tube bundle retains the inner fins onto the tube bundle and then removing the tube bundle with the inner fins attached from the fixture. The resultant evaporator comprises a serpentine tube bundle having a plurality of inner fins attached thereon wherein the inner fins are off-set to provide a staggered inner fin pattern.

Finned type heat exchangers are commonly used in a variety of heat exchanger-type apparatus. Finned heat exchangers having a tube bundle of a serpentine arrangement and fins mounted on the tubes are used in condensers and evaporators of refrigeration units, air conditioning units and the like. The fins are attached to the tube bundle and increase the effective heat absorbing area over which air flow is directed, thus increasing the cooling efficiency of the evaporator.

BACKGROUND OF THE INVENTION

Several attempts have been made to increase the cooling efficiency of the evaporator by varying the arrangement of the tube pattern and fin shape. U.S. Pat. No. 4,580,623 discloses a heat exchanger having parallel rows of serpentine tube coils slanted in the same direction and using ultra thin fins having a pattern embossed thereon to induce turbulence in the air flow over the evaporator.

Another method of arranging the serpentine tube coils to increase the cooling efficiency of the evaporator is described in U.S. Pat. No. 5,183,105. This construction has a continuous tube with a plurality of reverse bends forming a plurality of parallel tube rows arranged in sets of two as determined by each of the respective-reverse bends. The tubes in the tube bundle are arranged such that, when viewed in cross section, lines drawn between the centers of the sets of two tubes form a herringbone pattern.

While these methods increase the cooling efficiency of the evaporator by using the staggered arrangement of the tube bundle, further cooling efficiency can be obtained by a more efficient arrangement of the fins.

SUMMARY OF THE INVENTION

The present invention is directed to a method of making an evaporator and to the resultant evaporator. The evaporator comprises a continuous serpentine tube having an inlet and an outlet. The serpentine tube includes at least one column of parallel tube runs. Each tube run is defined by at least one reverse bend. The column of parallel tube runs has an overall length defined by the distance between the outermost tube runs. The evaporator further comprises a plurality of inner fins attached to the individual tubes. Each inner fin extends between two tube runs defined by opposite ends of a reverse bend. The inner fins have a length less than the overall length the column of tube runs.

BRIEF DESCRIPTION OF THE DRAWINGS

FIG. 9 is a front view of an evaporator having three columns of tube runs inserted into the inner fins.

FIG. 10 is a side view of the evaporator of FIG. 9 having three columns of tube runs inserted into the inner fins.

DETAILED DESCRIPTION OF THE PREFERRED EMBODIMENTS

Figure 1:
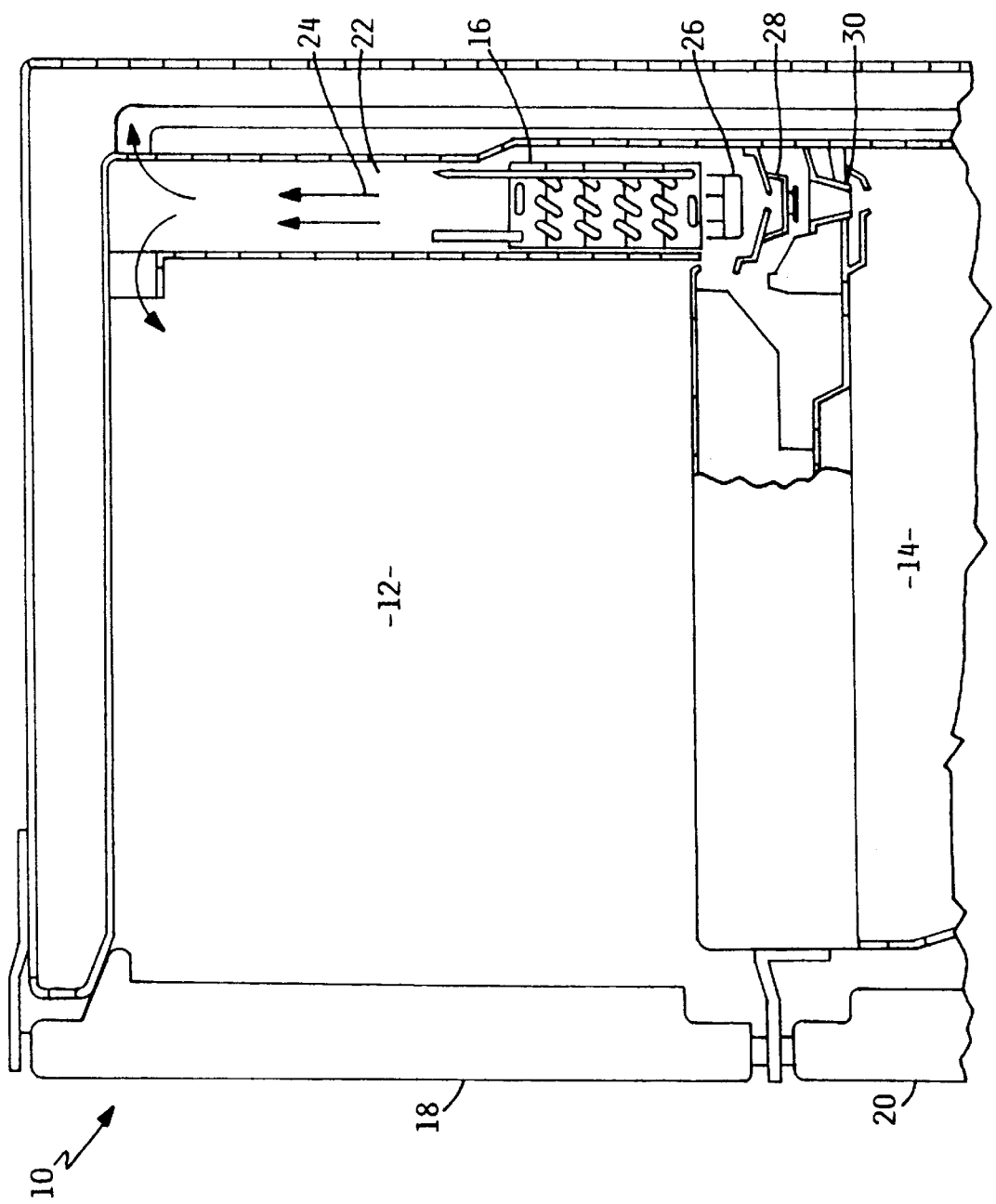
FIG. 1 is a cross-sectional view of a refrigerator cabinet disposed within the freezer compartment including an evaporator according to a preferred embodiment of the invention.

Evaporators are used in a variety of environments to exchange heat between a first medium isolated from a second medium. FIG. 1 shows a typical refrigerator cabinet 10 having a freezer compartment 12 and a refrigeration compartment 14. Cold air for the freezer and refrigeration compartments 12 and 14 is provided by an evaporator 16. The freezer compartment 12 is sealed closed by freezer door 18 having appropriate perimeter gaskets. The refrigeration compartment 14 is similarly sealed closed by refrigeration door 20. An evaporator 16 in accordance with the present invention is placed in a passageway 22 and is used to cool the air drawn in the direction indicated by the arrow 24, over the evaporator 16 and discharged into both the refrigeration and freezer compartments 12 and 14 by a fan (not shown).

The evaporator 16 is placed in a high humidity environment wherein cooling the air causes moisture to condense on the evaporator, resulting in the formation of frost and ice. As frost and ice gather on the evaporator 16, a heater element 26 is actuated to melt ice and frost from the evaporator 16. The resultant water is collected on a collecting pan 28 and removed through a drain 30 from the refrigerator.

Figures 2, 3:
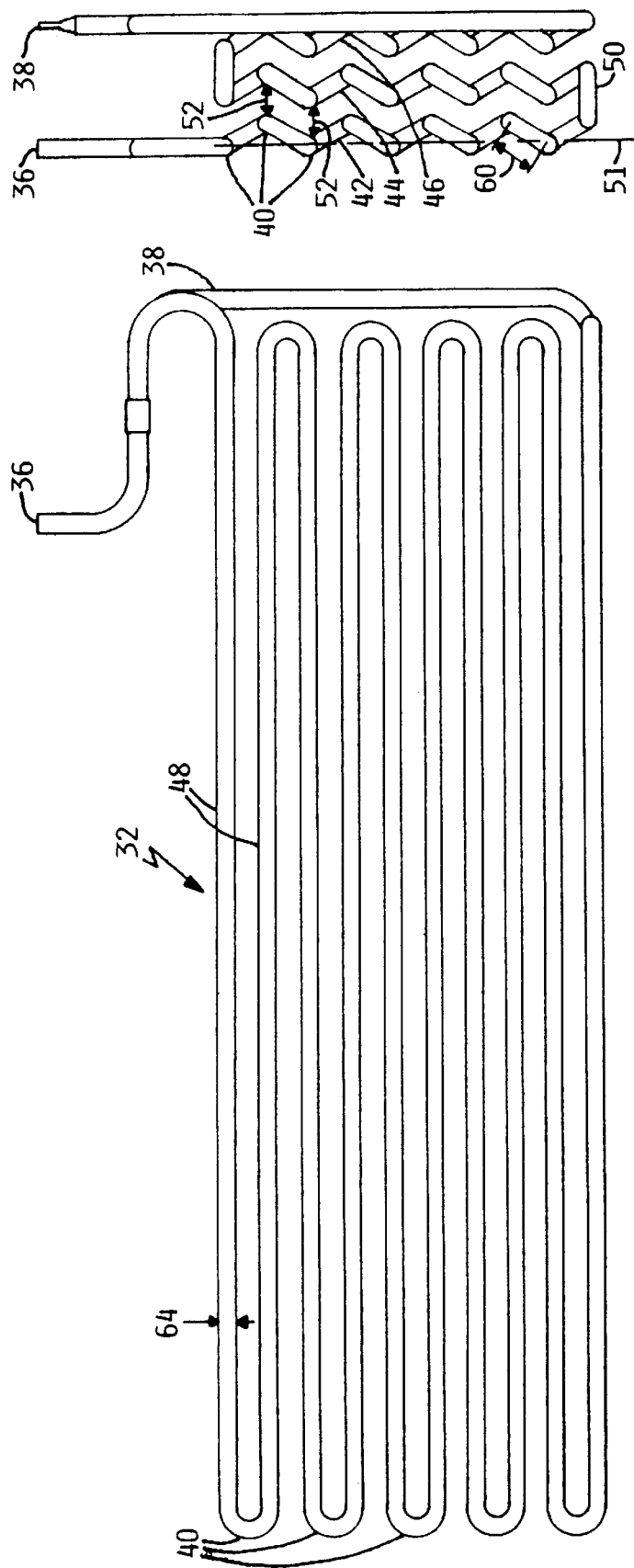
FIG. 2 is a front view of a tube bundle having three columns of tube runs
FIG. 3 is a side view of the tube bundle having three columns of tube runs shown in FIG. 2.

Referring now to FIGS. 2–10, the evaporator 16 comprises a serpentine tube bundle 32 and a plurality of inner fins 34 mounted on the serpentine tube bundle 32. As shown in FIGS. 2 and 3, the serpentine tube bundle 32 is a continuous tube having an inlet 36 and an outlet 38 with a plurality of reverse bends 40 forming three columns 42, 44 and 46 of staggered and parallel rows of tube runs 48. It should be noted that the term "continuous tube" does not require the tube to be formed from a single tube. The continuous tube can be several individual tubes joined by abutting the ends together to form a continuous tube. The reverse bends 40 bend the tube 180 degrees (as shown in FIG. 2) allowing the tube runs 48 in each column and between columns to be parallel. Each reverse bend 40 also staggers the sequential tube run such that the next tube run is not linearly inline with the previous tube run when the tube bundle is viewed from the side. Rather, every other tube run is linearly inline. This offset of the tube runs 48 increases the surface area of the tube runs which are disposed in the path of the air drawn in for cooling, thus increasing convection heat transfer.

The rows of parallel and staggered tube runs 48 continue for a number of rows to form a column of tube runs. At the end of the first column 42 of tube runs, an end reverse bend 50, extending generally perpendicularly to the centerline 51 of the first column 42, bends the tube to start a second column 44 of tube runs. The second column 44 of tube runs 48 is formed of rows of parallel and staggered tube runs, as in the first column. However, the second column extends generally back toward the start of the first column. Each tube run 48 of the second column 44 is situated directly behind a corresponding tube run of the first column 42. The spacing 52 between each of the tube run of the second column 44 and the corresponding tube run of the first column 42 (directly in front of the tube run of the second column 44) is approximately the same for each set of tube runs. Likewise, each reverse bend of the second column 44 is situated directly behind and angled in a similar direction as a corresponding reverse bend of the first column 42. Similarly, a third column 46 of tube runs 48 is formed.

Figure 4:
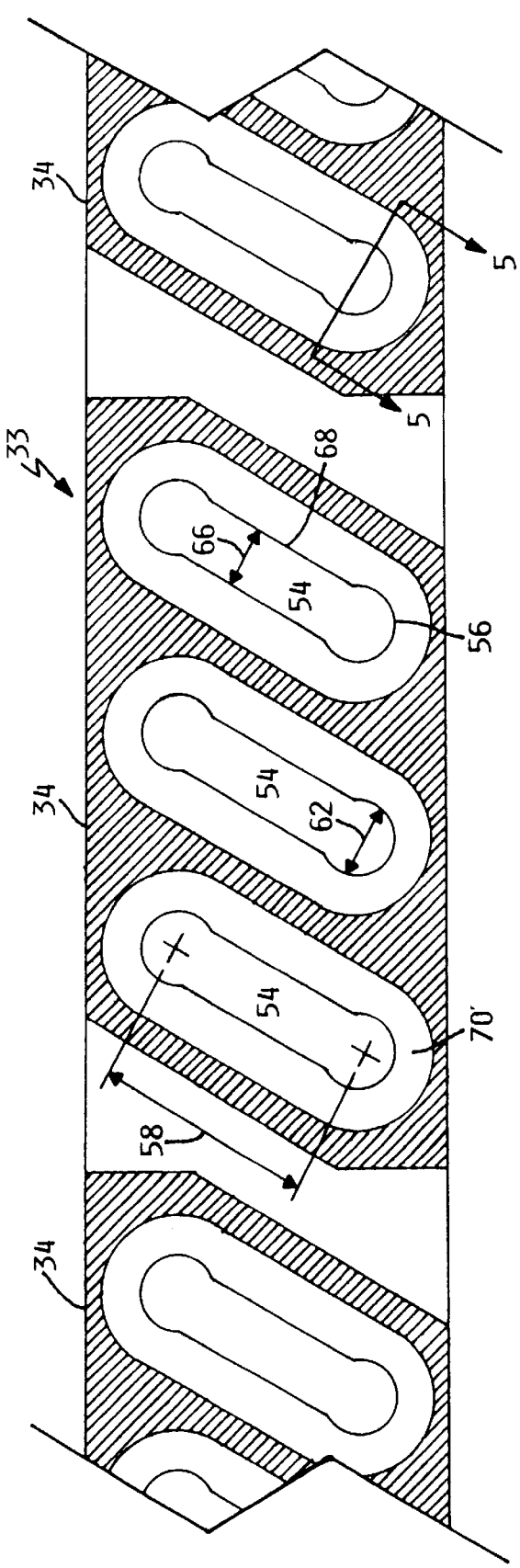
FIG. 4 is a front view showing in detail an inner fin for a tube bundle having three columns of tube runs.

A plurality of inner fins are mounted onto the tube bundle for further increasing the effective heat absorbing area. The inner fins of the present invention are formed from continuous strips of metal, for example, by stamping or rolling. FIG. 4 shows in detail a continuous strip 33 of inner fins 34 for use with a serpentine tube bundle 32 of the preferred embodiment. The inner fins 34 are formed into continuous strip 33 but are not separated at this stage. By not separating the individual inner fins 34 at this stage, the continuous strips 34 can be easily rolled up for storage or transfer to the next assembly stage, if required.

Each inner fin 34 has three equally spaced slots 54 cut into the interior surface of inner fin 34. The number of slots and the location of the slots correspond to the number of columns of tube runs and the location of reverse bends 40 of the columns 42, 44 and 46. An enlarged radius 56 is formed at both terminal ends of each slot 54. The distance 58 between the locus of the enlarged radius 56 is approximately equal to the distance 60 (FIG. 3) between the center of the tube runs of the opposite ends of a reverse bend.

The diameter 62 of the enlarged radius 56 is slightly smaller than the diameter 64 of the tubes 48 (FIG. 2), thus allowing the enlarged radius 56 to snuggly surround the tube upon mounting the inner fin 34 onto the tube bundle 32 and provide an interference fit thereto. The width 66 of the middle section 68 of the slot 54 is narrower than the diameter 62 of the enlarged radius 56. The narrower middle section 68 of each slot 54 provides rigidity for retaining the inner fin 34 onto the tube bundle 32 while still allowing sufficient clearance for the reverse bend 40 to slip past the slot 54.

Figure 5:
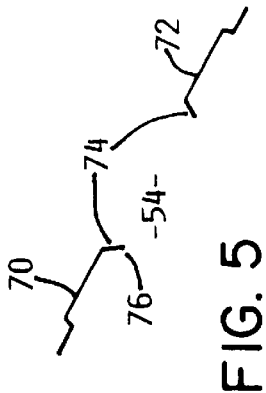
FIG. 5 is a cross-sectional view, as taken approximately along the lines 5—5.
Figure 6:
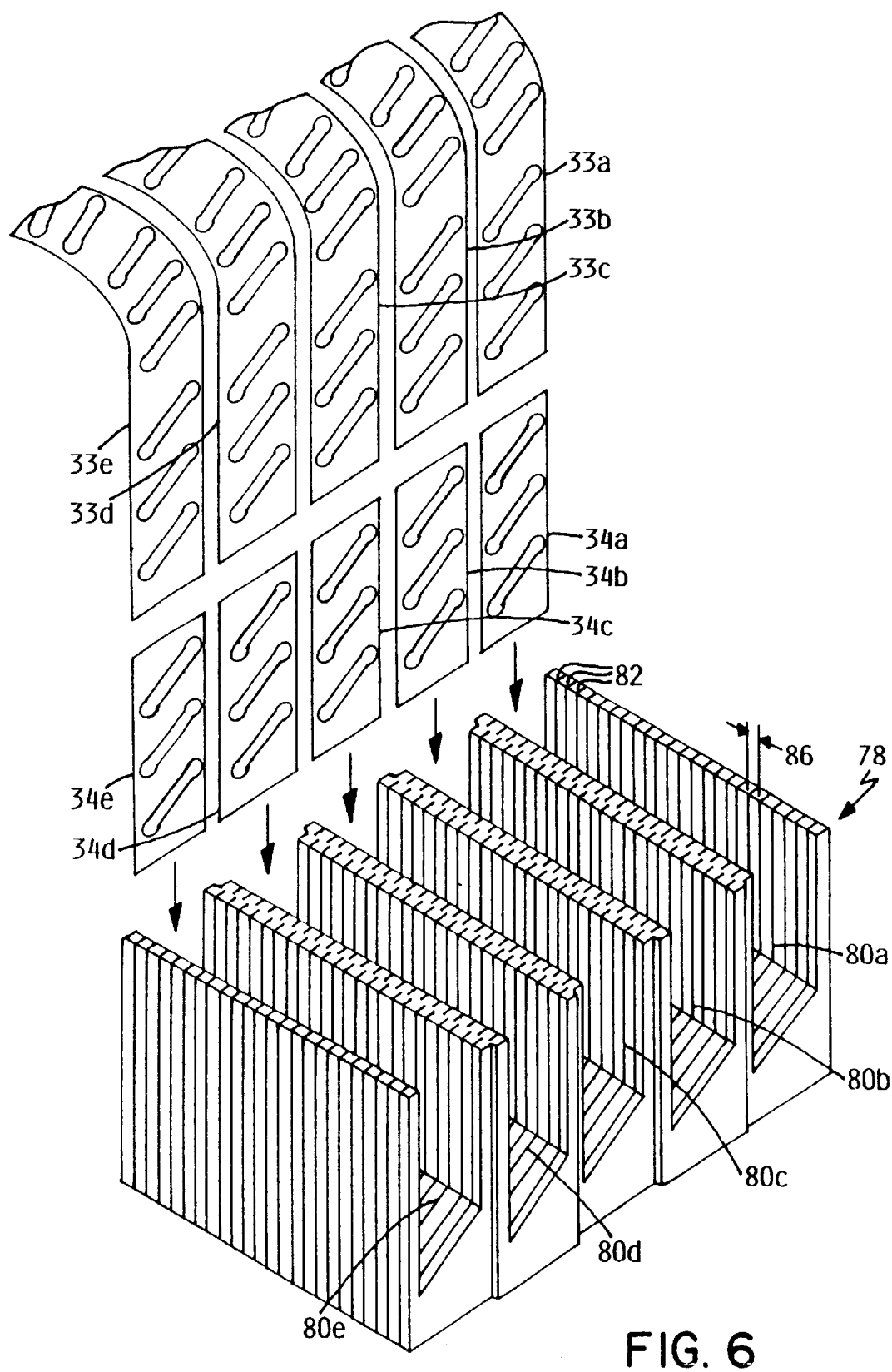
FIG. 6 is a perspective view of a fixture for retaining inner fins in the desired configuration.

The inner fin 34 is further provided with an embossment pattern 70 surrounding the slot 54 for structurally reinforcing the inner fin, retaining the inner fin onto the tube bundle and providing turbulent flow of the air flowing over the inner fin. FIG. 5 is a cross-sectional view of the inner fin 34 taken approximately along lines 5—5 of FIG. 4 and through one of the enlarged radius 56, showing a side view of the embossment pattern 70. The embossment pattern 70 comprises a raised ridge 72 surrounding the slot and a tapered lip 74 surrounding the enlarged radius 56.

The raised ridge 72 provides the inner fin 34 with structural rigidity around the slot 54. In addition, by providing a break from the smooth surface of the inner fin 34, the raised ridge 72 increases turbulence in the flow of the air flowing over the inner fin 34. The turbulent flow increases the convention heat transfer and thus the efficiency of the evaporator 16.

The tapered lip 74 also provides structural rigidity to the inner fin 34. Furthermore, the tapered lip 74 allows the tube bundle 32 to be easily inserted into the slot 54 while resisting withdrawal of the tube bundle 32 from the slot 54 after the inner fin 34 has been installed onto the tube bundle 32. Once the inner fin 34 has been installed onto the tube bundle 32, the terminal end 76 of the tapered lip 74 contacts the outer surface of the tube 48. Upon applying force in the opposite direction of the tapered lip, the terminal end 76 abuts the outer surface of the tube and prevents the tube bundle 32 from withdrawing from the slot 54.

A fin fixture 78 is used to modularly build up several individual inner fins 34 into a configuration capable of receiving the tube bundle 32. The fixture 78 comprises a number of corresponding, oppositely disposed channels 80a, 80b, 80c, 80d and 80e defined therein. On the edges of each channel 80, a plurality of grooves are cut thereon to form fin retainers 82. The height, width and thickness of each fin retainer 82 is slightly larger than the height, width and thickness of inner fin 34. This allows the inner fins 34 to easily slip in and out of the fin retainers 82, while the fin retainers 82 are still able to orient and stack the inner fins 34 once the inner fins are inserted into the fin retainers 82.

The fin retainers 82 are formed such that each fin retainer is parallel with the other fin retainers. Furthermore, each fin retainer 82 is formed at an equal distance from the adjacent fin retainers. Thus, the spacing 86 between the fin retainers 82 is the same through out the entire fixture 78. The fin retainers 82 of each channel are offset from the fin retainers of the adjacent channels by approximately one-half the distance of the spacing 86 between the fin retainers. This offset of the fin retainers would correspondingly offset the inner fins 34 installed onto the tube bundle. The purpose of the offset of the inner fins is discussed below.

Five continuous strips 33a, 33b, 33c, 33d and 33e provide the inner fins to be inserted into the fin fixture 78. Each strip 33 is cut to desired length to form individual and separate inner fin 34. The number of continuous strips 33 corresponds to the number of channels 80 in the fin fixture 78.

After the individual inner fins 34 have been separated from strip 33, they are inserted into the fin retainers 82 such that the tapered lips 74 of the inner fins 34 are all directed in the direction of the insertion of the tube bundle. The inner fins 34 throughout the same channel 80 are also arranged such that slots 54 of successive inner fins are all aligned. The alignment of the slots 54 as installed in the fin retainers 82 corresponds to the angle of the reverse bends 40 of the tube bundle 32.

Figure 7:
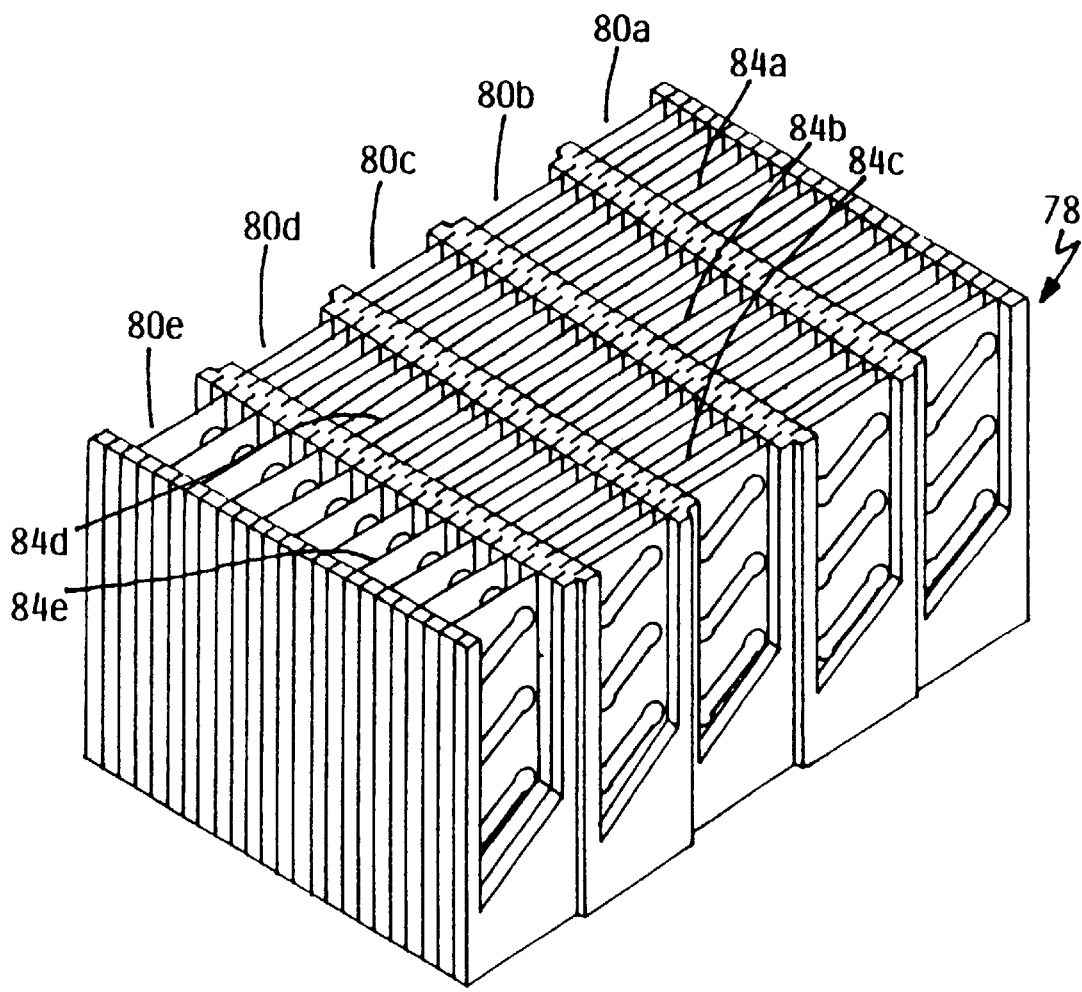
FIG. 7 is a perspective view of the fixture having inner fins inserted and retained therein.

FIG. 7 shows the fin fixture 78 with the inner fins 34 inserted in the fin retainers 82. The inner fins 34 inserted in the fin retainers of each channel 80 form a row 84 of inner fins 34. As shown in FIG. 7, the installation of an inner fin 34 is omitted for every other fin retainer 82 in the last channel 80a. This omission of the installation of an inner fin in every other fin retainer in essence increases the spacing between the inner fins installed in the last channel 80*a* to be twice as large as the spacing between the inner fins installed in the other channels 80. The purpose of the increased spacing between the inner fins 32 of the last row 84*a* will be discussed below.

Figure 8:
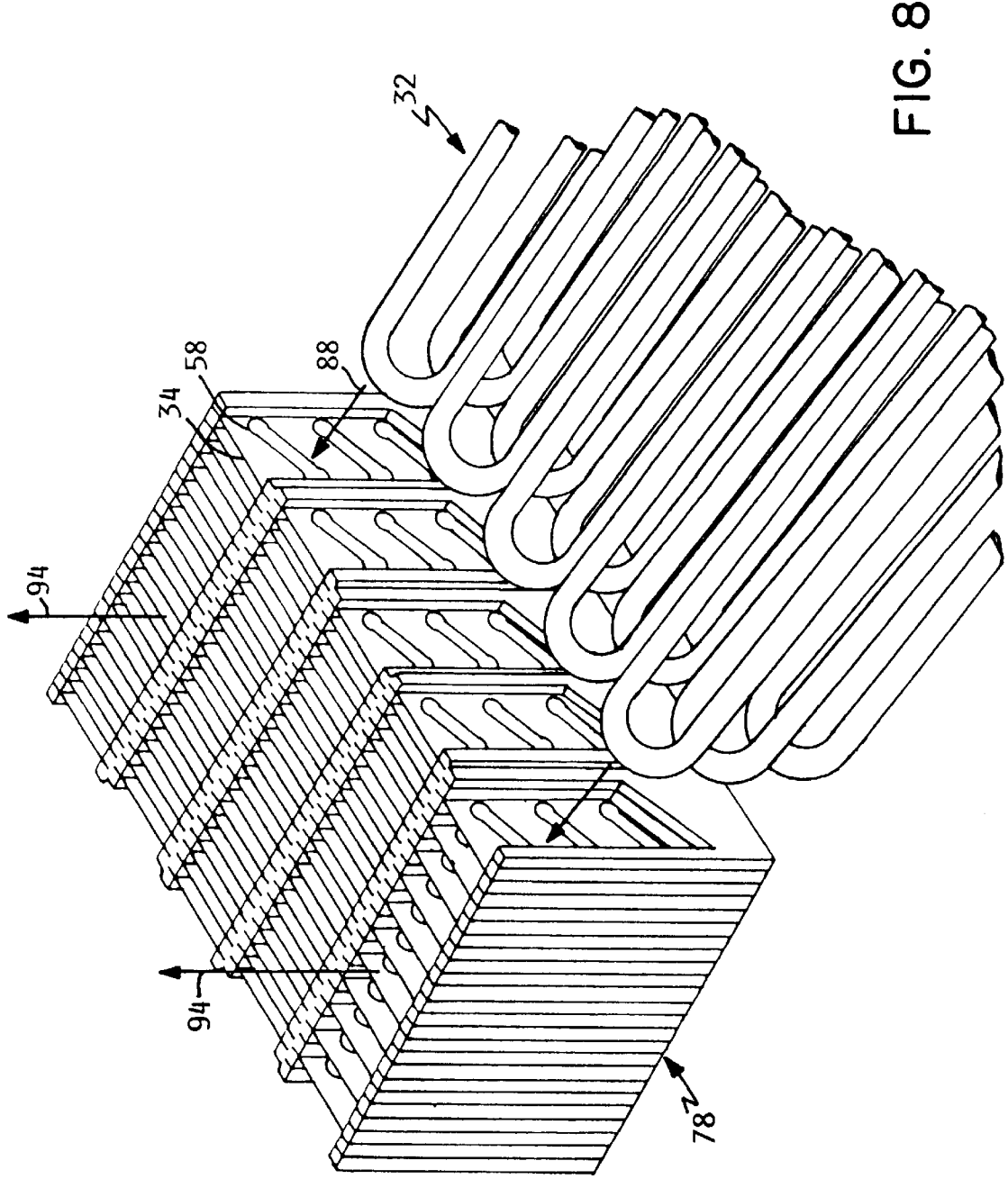
FIG. 8 illustrates a tube bundle just prior to insertion into the inner fins retained in the fixture.
Figure 11:
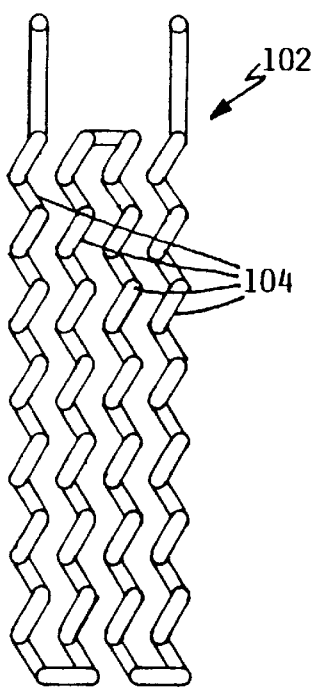
FIG. 11 is a side view of an alternative embodiment of a tube bundle having four columns of tube runs.
Figure 12:
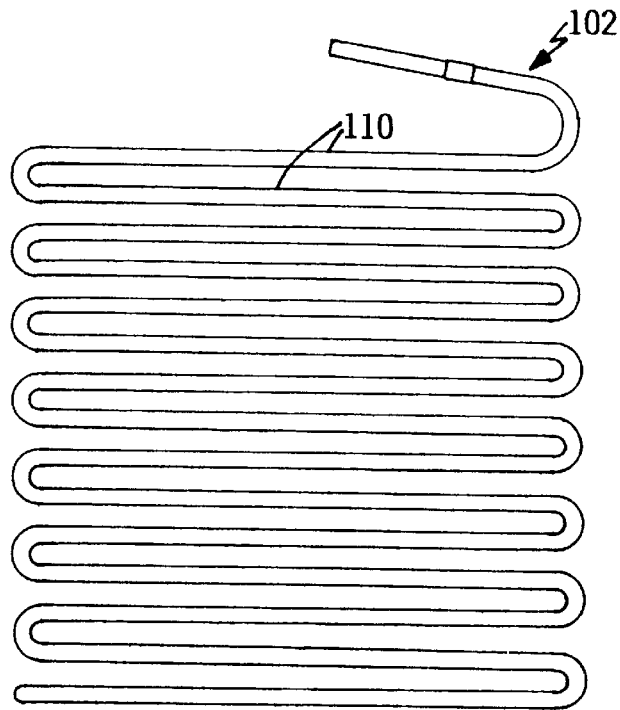
FIG. 12 is a front view of the alternative embodiment of the tube bundle having four columns of tube runs as shown in FIG. 11.
Figure 13:
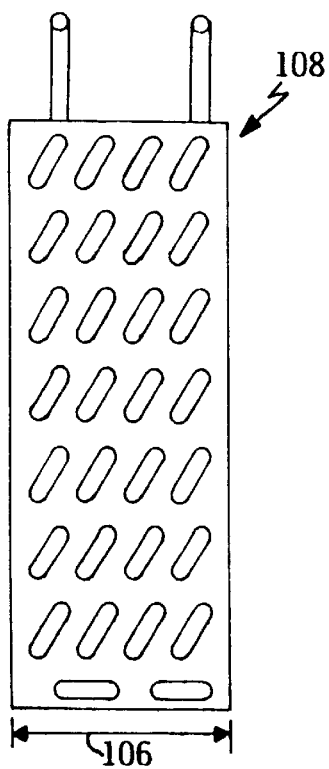
FIG. 13 is a side view of an alternative embodiment of an evaporator having four columns of tube runs inserted into the inner fins.
Figure 14:
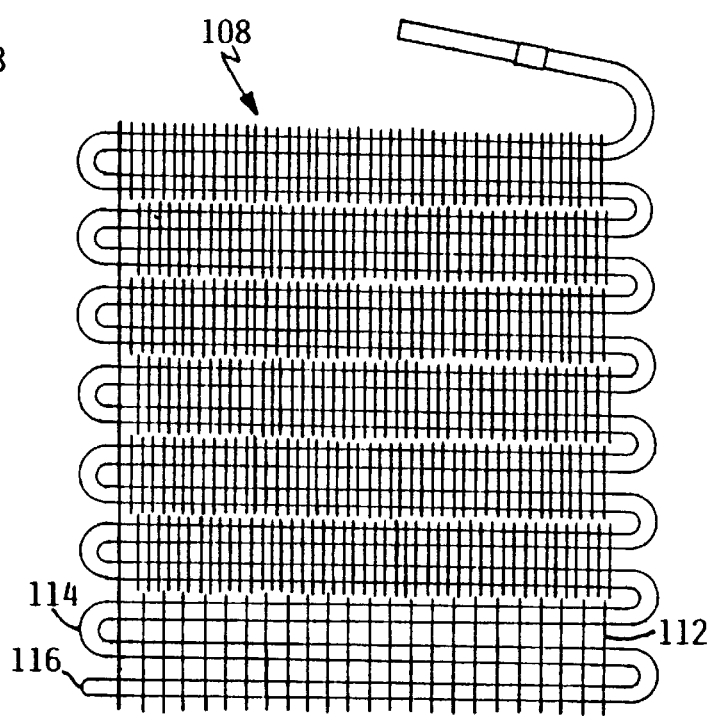
FIG. 14 is a front view of the alternative embodiment of the evaporator of FIG. 13 having four columns of tube runs inserted into the inner fins.

Referring now to FIG. 8, the inner fins 34 are inserted into the fin retainers 82 and the tube bundle 32 is inserted into slots 54 of the inner fins 34 in the direction of arrow 88, taking care that each reverse bend is inserted into a slot 54 of the first inner fins 34 in each column. The tapered lips 76 of each inner fin are also directed in the direction of arrow 88. Therefore, the tapered lips 76 assist in guiding the tube bundle 32 during insertion of the tube bundle into slots 54 of the inner fins 34. The tube bundle 32 is inserted at a distance such that the exposed length 90 the tube runs inserted through the inner fins is approximately one spacing 86 between the fin retainer 62 greater than the exposed length 92 of the non-inserted tube runs (FIG. 9). As the insertion of the tube bundle 32 proceeds into adjacent fins 34, each slot is positioned and oriented to receive the reverse bend 40 without excessive bending of the tube runs 48. Since the diameter 62 of the enlarged radius 56 of the inner fin 34 is slightly smaller than the diameter 64 of the tube 48, an interference fit results between the enlarged radius and the tube 48 upon insertion of tube bundle 32 into the inner fins 34. This interference fit retains the inner fins 34 onto the tube bundle 32.

After the tube bundle 32 has been inserted through the slots 54 of the inner fins 34, the tube bundle with the inner fins attached are then removed from the fin fixture 78 in the direction of arrows 94.

Referring now to FIG. 9, the tube bundle 32 with the inner fins attached are then inserted into a single outer fin 96. As opposed to the inner fin having a length less than the overall length 98 of each column 42,44 and 46 of tube runs, the single outer fin 96 has a length greater than the overall length 98 of the column of tube runs.

Similar to the inner fin 34, the outer fin 96 is formed from one continuous strip of metal. The outer fin 96 has three columns and five rows of slots cut into the outer fin 96. The number of slots and the location of the slots correspond to the number of reverse bends 40 and the location of the reverse bends inserted through the inner fins 34. The tube bundle is inserted through the outer fin 96 until the spacing 100 between the outer fin 96 and the outermost inner fins 34*a* is equal to the spacing 86 between the inner fins 34 of channels 80. In addition to increasing the effective heat absorbing area, the single fin 96 also acts as a support at the end of the evaporator 16, thus eliminating the need for a bracket at the end of the evaporator 16.

The fin fixture of the present invention offers several advantages over using spacers to locate the inner fins during installation of the tube bundle into the inner fins. First, the fin fixture of the present invention allows identical inner fins to be used for different size evaporators. For instance, the preferred embodiment consists of ten tube runs per column. Therefore, five channels providing five rows of inner fins are required. Should an evaporator require greater cooling capacity, two additional tube runs could be added to each column of the tube bundle to extend the length of the column. To accommodate for an increased number of tube runs, additional channels would be added to the fin fixture. Since the distance between the tube runs of first tube bundle, having ten tube runs per column, is the same as the distance between the runs of the second tube bundle, having twelve tube runs per column, a common inner fin could be used in both fixtures for making the two different size evaporators. This interchangeability of the inner fins allows evaporators having different cooling capacity to be built without having to increase the complexity of the inner fins. Other configurations of tubes and columns are possible, depending on the application for which the evaporator will be used.

Another advantage of the fin fixture is the allowance of the placement of the inner fins in one channel to be independent from the placement of the inner fins in another channel, since each channel has its own sets of fin retainers. The independence of the placement of the inner fins of one channel from another channel allows the inner fins aligned by one channel to be offset with the inner fins aligned by another channel. Furthermore, the independence of the placement of the inner fins allows the spacing between the inner fins resulting from one channel to be different the spacing between the inner fins resulting from another channel.

A third advantage of the fin fixture is the consistency of the placement of and spacing between the inner fins of the resulting evaporator. The fin fixture is a rigid structure. Hence, the placement of the inner fins will be consistently evenly spaced on the resulting evaporator.

FIGS. 9 and 10 show the resulting evaporator 16. Inner fins 34 are mounted onto the tube bundle 32. Each inner fin 32 is retained on and extends between the tube runs of the opposite ends of a reverse bend 40. Since the fin retainers 82 of each channel 80 are equally spaced, the inner fins 34 of each row 84 are likewise equally spaced. The inner fins 34 of each row 84 are offset from the inner fins of the adjacent row by approximately one-half of the spacing 86 between the inner fins. Therefore, the inner fins of one row are situated behind the center of the spacing between the inner fins of the adjacent row. This offset of the inner fins 34 provides a staggered arrangement in the direction of the air flow as indicated by arrow 24. The staggered arrangement of the inner fin 34 increases the area of the inner fins coming in contact with the air flow, thus increasing the convection heat transfer and the efficiency of the evaporator.

It is common knowledge in the industry that frost build up can be controlled by varying the spacing between the inner fins 34. Since inner fins in the bottom row 84*a* of inner fins come into contact with the moist air first, more frost tends to build up on the inner fins 34 of the bottom row 84*a* than the inner fins of the other rows. For this reason, the spacing between the inner fins of the bottom row 84*a* is greater than the spacing between the inner fins of other rows. This increased spacing between the inner fins of the bottom row allows a greater amount of frost to be built up on the inner fins of the bottom row while still allowing sufficient spacing for the air to travel through the frost buildup. This increased space between the fins allows a greater time interval between the need to activate the heater element 26 to melt the frost build up on the evaporator.

The usage of the five separate strips 33 for forming the fins allows the increased spacing between the inner fins 32 of the last row 84*e* without creating waste in fin material. Since each row 84 is formed from a separate continuous strip 33, the continuous strip 33*e* for forming the last row 84*e* will be consumed at a slower rate than the continuous strips for forming the other rows. Allowing the continuous strips 33 to be consumed at different rates eliminates waste fin material or increased complexity compared to a process in which the fins are formed from one large sheet rather than five narrow strips. To allow for an increased spacing between the fins at the end of the evaporator if one large sheet is used for forming the fins, every other fin would need to trimmed to allow the spacing between the fins at the end of the evaporator to be greater than the spacing between the fins at the remaining portion of the evaporator. This process of trimming the fins has the undesirable effect of creating waste fin material. Rather than trimming the fins, another approach is to use two different sets of inner fins. One set of fins would extend beyond the overall length of the column of tube runs. A second set of fins would be shortened at the end to define the increased spacing at the bottom of the evaporator. However, this approach is also undesirable since it would increase the complexity of the inner fins. By providing a separate continuous strip 33 for each channel 80, the spacing between the inner fins at the end of the evaporator can be increased without creating wasted fin material or increasing complexity.

The usage of individual strips 33 for each channel 80 for forming the inner fins 32 also allows for varying the spacing between the inner fins 32 beyond the preferred embodiment as shown in FIGS. 7–10. In addition to increasing the spacing between the inner fins 32b of the last row 84e, the spacing between the inner fins 32 of the other rows 84 can also be increased by the omitting the installation of an inner fin 32 in every other fin retainer 82 for the desired channel 80. The spacing between the inner fins 32 can be further increased by the omission of the installation of inner fins 32 in two or more consecutive fin retainers 82.

In addition to varying the spacing between the inner fins from one row of inner fins with another row of inner fins, the spacing between the inner fins within the same row can also be varied. This can be accomplished by selectively omitting the installation of an inner fin 32 in certain predetermined fin retainers 82. Having the ability to vary the spacing between the inner fins within the same row offers several advantages over an evaporator having equal spacing between the fins. First, by having the ability to vary the spacing between the inner fins within the same row, the spacing between the inner fins at one side of the evaporator can be greater than the spacing between the inner fins at the other side of the evaporator. This fin arrangement allows for a greater build up of frost on one side of the evaporator while still allowing sufficient spacing for the air to travel through the frost buildup. This fin arrangement is particularly important when the refrigerator has a vegetable crisper. Since vegetables and fruits generally contain a large amount moisture, the air drawn from the vegetable crisper will have a higher amount of moisture than the air drawn the other portions of the refrigerator. Depending on the design of the air passages leading to the evaporator, the air drawn from the vegetable crisper may be directed more to one side of the evaporator than the other side of the evaporator. Therefore, the side of the evaporator in which the air from the vegetable crisper is drawn to will have a greater amount of frost buildup. By increasing the spacing between the inner fins at the side the air from vegetable crisper is drawn to allows the air to flow through the entire evaporator even though there is a greater amount of frost buildup at one side of the evaporator.

The ability to vary the spacing within the same row also allows for a shorter row of inner fins to be formed. This can be accomplished by omitting the insertion of inner fins in the fin retainers 82 at one end of the channel 80 and having shorter tube runs 48 which are to be inserted into the inner fins 32 of that channel 80. The formation of a shorter row of inner fins and tube runs allows the evaporator to be shaped in a non-rectangular shape thus allowing for clearance of adjacent components, if necessary. For instance, a non-rectangular shaped evaporator allows for a notch to be formed at one side of the evaporator. A notched portion of the evaporator provides for the necessary clearance for a mount for mounting the evaporator to the refrigerator while still allowing the remaining portions of the evaporator to extend throughout the air flow passage. A notched portion of the evaporator also provides for allows the necessary clearance to attached a sensor or control module on the evaporator while still allowing the remaining portions of the evaporator to extend throughout the air flow passage.

In addition to increasing or decreasing the number of tube runs in each column to increase or decrease the cooling capacity of the evaporator, the width of the evaporator can also be varied to affect the cooling capacity of the evaporator. The latter can be achieved by increasing or decreasing the number of columns.

FIGS. 11–14 shows an embodiment having a greater width. In this alternative embodiment, the tube bundle 102 is formed with four columns 104 of tube runs. The increased number of columns increases the width 106 of the evaporator 108 and, hence, the cooling capacity of the evaporator 108.

This alternative embodiment also depicts a tube bundle 102 having an odd number of tube runs 110 in each column 104. To accommodate for the odd number of tube runs, the last row 112 of inner fins defines not only slots aligned with the reverse bends 114 but also slots aligned to receive end bends 116. Therefore, it is sometimes necessary to have the inner fins in one row different from the inner fins in the other rows.

Various features of the present invention have been described with reference to the preferred embodiment. It should be understood that modifications may be made to the method of making an evaporator and the resultant evaporator without departing from the spirit and scope of the present invention as represented by the following claims. For instance, the above embodiments depict every inner fin being offset from the proceeding inner fin in the adjacent row. An evaporator can be made with only some inner fins offset from the proceeding inner fins in the adjacent row, while other inner fins are inline with the proceeding inner fins in the adjacent row. Such an evaporator would still take advantage of the increased convection heat transfer by staggering some of the inner fins.

What is claimed is:

1. A method of forming an evaporator comprising the steps of:

providing a continuous tube;

bending said tube into a serpentine tube pattern to include a column of parallel tube runs including an outermost tube run at one end of said column of tube runs and another outermost tube run at the other end of said column of tube runs, each tube run defined by at least one reverse bend, said column of parallel tube runs having an overall length defined by the distance between the outermost tube runs;

providing a plurality of inner fins having a length less than the overall length of said column of tube runs, each said inner fin having a slot, wherein the slots in adjacent inner fins are aligned and oriented in identical directions to receive said reverse bend of said serpentine tube;

inserting at least one reverse bend of said serpentine tube through said aligned set of slots in said plurality of inner fins; and wherein each inner fin is retained on the tube runs of the opposite ends of the inserted reverse bend such that each inner fin extends between the tube runs of the opposite ends of the inserted reverse bend.

2. The method of forming an evaporator according to claim 1 wherein said step of inserting at least one reverse bend through said slots in said plurality of inner fins further comprising inserting a first reverse bend through the slots of a first set of inner fins and a second reverse bend through the slots of a second set of inner fins, the inner fins retained on the tube runs defined by the opposite ends of said first reverse bend being off-set with the inner fins retained on the tube runs defined by the opposite ends of said second reverse bend to provide a staggered inner fin pattern.

3. The method of forming an evaporator according to claim 1 wherein said step of inserting at least one reverse bend through said slots in said plurality of inner fins further comprising inserting a first reverse bend through the slots of a first set of inner fins and a second reverse bend through the slots of a second set of inner fins, each inner fin retained on the tube runs defined by the opposite ends of said first reverse bend being equally spaced with the adjacent inner fins retained on the tube runs defined by the opposite ends of said first reverse bend, each inner fin retained on the tube runs of the opposite ends of said second reverse bend being equally spaced with the adjacent inner fins retained on the tube runs defined by the opposite end of said second reverse bend, the spacing between the inner fins retained on the tube runs of the opposite ends of said first reverse bend being greater than the spacing between the inner fins retained on the tube runs of the opposite end of said second reverse bend.

4. The method of forming an evaporator according to claim 1 wherein said step of bending said tube further comprising bending said tube such that the tube runs defined by the opposite ends of a reverse bend are off-set to provide a staggered tube pattern.

5. The method of forming an evaporator according to claim 1 further comprising the steps of providing an outer fin having a length greater than the overall length of the column of tube run and inserting said tube with inner fins attached into said outer fin.

6. A method of forming an evaporator comprising the steps of:
   providing a continuous tube;
   bending said tubing into a serpentine tube pattern; said serpentine tube including a column of parallel tube runs, each tube run defined by at least one reverse bend;
   providing a first set of inner fins and a second set of inner fins, each said inner fin having a slot;
   providing a fin fixture having a first channel and a second channel, said first channel having a first set of fin retainers, said second channel having a second set of fin retainers;
   inserting and retaining said first set of inner fins in said first set of fin retainers, inserting and retaining said second set of inner fins in said second set of fin retainers;
   inserting a first reverse bend of said serpentine tube through said slots in said first set of inner fins, inserting a second reverse bend of said serpentine tube through said slots in said second set of inner fins;
   removing said sets inner fins having said serpentine tube inserted therein from said fin fixture.

7. The method of forming an evaporator according to claim 6 wherein said first set of fin retainers are off-set from said second set of fin retainers.

8. The method of forming an evaporator according to claim 6 further comprising the step of providing an outer fin and inserting said serpentine tube into said outer fin.

9. The method of forming an evaporator according to claim 6 wherein said first fin retainers are equally spaced and said second fin retainers are equally spaced.

10. The method of forming an evaporator according to claim 9 wherein the spacing between the fin retainers of said first channel being greater than the spacing between the fin retainers of said second channel.

11. A method of forming an evaporator comprising the steps of:
    providing a continuous tube;
    bending said tubing into a serpentine tube pattern; said serpentine tube including a column of parallel tube runs, each tube run defined by at least one reverse bend;
    providing a fin fixture having a first channel and a second channel, said first channel having a plurality of fin retainers, second channel having a second set of fin retainers;
    providing a first continuous strip of fins, said first continuous strip of fins comprising a first set of inner fins, providing a second continuous strip of fins, said second continuous strip of fins comprising a second set of inner fins, said each inner fin having a slot;
    separating said first set of inner fins, separating said second set of inner fins;
    inserting and retaining said first set of inner fins in said first set of fin retainers, inserting and retaining said second set of inner fins in said first set of fin retainers;
    inserting a first reverse bend of said serpentine tube through said slots in said first set of inner fins, inserting a second reverse bend of said serpentine tube through said slots in said second set of inner fins;
    removing said inner fins having said serpentine tube inserted therein from said fin fixture.

12. The method of forming an evaporator according to claim 11 wherein said first set of fin retainers are off-set from said second set of fin retainers.

13. The method of forming an evaporator according to claim 11 further comprising the step of providing an outer fin and inserting said serpentine tube into said outer fin.

14. The method of forming an evaporator according to claim 1 wherein said fixture has a first channel and a second channel, the spacing between the fin retainers of said first channel being greater than the spacing between the fin retainers of said second channel.

15. The method of forming an evaporator according to claim 6 wherein said serpentine tube includes an outermost tube run at one end of said column of tube runs and another outermost tube run at the other end of said column of tube runs, said column of tube runs having an overall length defined by the distance between the outermost tube runs, the length of each inner fins is less than the overall length of said column of tube runs.

16. The method of forming an evaporator according to claim 6 wherein said serpentine tube includes an outermost tube run at one end of said column of tube runs and another outermost tube run at the other end of said column of tube runs, said column of tube runs having an overall length defined by the distance between the outermost tube runs, the width of each column of said fin fixture is less than the overall length of said column of tube runs.

17. The method of forming an evaporator according to claim 11 wherein said serpentine tube includes an outermost tube run at one end of said column of tube runs and another outermost tube run at the other end of said column of tube runs, said column of tube runs having an overall length defined by the distance between the outermost tube runs, the width of each continuous strip of fins is less than the overall length of said column of tube runs.

18. The method of forming an evaporator according to claim 11 wherein said serpentine tube includes an outermost tube run at one end of said column of tube runs and another outermost tube run at the other end of said column of tube runs, said column of tube runs having an overall length defined by the distance between the outermost tube runs, the width of each column of said fin fixture is less than the overall length of said column of tube runs.

* * * * *